(12) United States Patent
Ros

(10) Patent No.: US 11,187,450 B2
(45) Date of Patent: Nov. 30, 2021

(54) TRANSPORT CONTAINER

(71) Applicant: REP IP AG, Oberwil b. Zug (CH)

(72) Inventor: Nico Ros, Riehen (CH)

(73) Assignee: REP IP AG, Oberwil b. Zug (CH)

( * ) Notice: Subject to any disclaimer, the term of this patent is extended or adjusted under 35 U.S.C. 154(b) by 352 days.

(21) Appl. No.: 16/324,170

(22) PCT Filed: Aug. 9, 2017

(86) PCT No.: PCT/IB2017/000940
§ 371 (c)(1),
(2) Date: Feb. 8, 2019

(87) PCT Pub. No.: WO2018/029521
PCT Pub. Date: Feb. 15, 2018

(65) Prior Publication Data
US 2021/0222942 A1 Jul. 22, 2021

(30) Foreign Application Priority Data
Aug. 9, 2016 (AT) .................................. A 367/2016

(51) Int. Cl.
*F25D 11/00* (2006.01)
*F25B 17/08* (2006.01)
(Continued)

(52) U.S. Cl.
CPC ............ *F25D 11/003* (2013.01); *F25B 17/08* (2013.01); *F25D 3/08* (2013.01); *F25D 11/027* (2013.01);
(Continued)

(58) Field of Classification Search
CPC ........ F25D 11/003; F25D 11/027; F25D 3/08; F25D 2303/08; F25D 2331/804; F25B 17/08
See application file for complete search history.

(56) References Cited

U.S. PATENT DOCUMENTS 1,729,081 A * 9/1929 Miller .................... F25B 17/08
62/106
1,729,082 A 9/1929 Miller et al.
(Continued)

FOREIGN PATENT DOCUMENTS

DE 1262306 B 3/1968
DE 3412556 A1 10/1985
(Continued)

OTHER PUBLICATIONS

Office Action dated Mar. 1, 2021 issued in corresponding U.S. Appl. No. 16/324,149 (13 pgs.).
(Continued)

*Primary Examiner* — Emmanuel E Duke
(74) *Attorney, Agent, or Firm* — Pillsbury Winthrop Shaw Pittman, LLP

(57) ABSTRACT

A transport container for transporting temperature-sensitive transport goods comprising a chamber for receiving the transport goods, a casing enclosing the chamber and at least one cooling element for temperature control of the chamber, wherein the cooling element comprises an evaporation element with a cooling surface, a desiccant for receiving coolant evaporated in the evaporation element and a reservoir for the coolant which is fluidly connectable with the evaporation element. Means are provided for evaporating the coolant stored in the desiccant and the desiccant is connected to the reservoir for transporting the vaporized coolant to the reservoir.

20 Claims, 2 Drawing Sheets

(51) Int. Cl.
*F25D 11/02* (2006.01)
*F25D 3/08* (2006.01)

(52) U.S. Cl.
CPC .... *F25D 2303/08* (2013.01); *F25D 2331/804* (2013.01)

(56) References Cited

U.S. PATENT DOCUMENTS

| | | | |
|---|---|---|---|
| 4,152,901 A * | 5/1979 | Munters | B01D 61/022 62/112 |
| 4,199,959 A * | 4/1980 | Wurm | F25B 17/083 62/480 |
| 5,497,630 A | 3/1996 | Stein et al. | |
| 6,412,295 B2 * | 7/2002 | Weiss | F25B 17/08 62/238.3 |
| 7,213,403 B2 * | 5/2007 | Maier-Laxhuber | F25B 17/08 62/109 |
| 2002/0189279 A1 | 12/2002 | Pfister et al. | |
| 2004/0079106 A1 * | 4/2004 | Maier-Laxhuber | F25B 17/08 62/480 |
| 2009/0301127 A1 * | 12/2009 | Kaufman | F25B 17/083 62/480 |
| 2010/0024439 A1 | 2/2010 | Finke et al. | |
| 2010/0170286 A1 | 7/2010 | Ghiraldi | |
| 2012/0097216 A1 | 4/2012 | Lin et al. | |
| 2013/0152612 A1 | 6/2013 | Smith et al. | |
| 2014/0290293 A1 * | 10/2014 | Eckhoff | F28C 3/08 62/218 |
| 2014/0360214 A1 | 12/2014 | Tansley | |
| 2016/0290696 A1 * | 10/2016 | Barot | B60H 1/32014 |

FOREIGN PATENT DOCUMENTS

| | | |
|---|---|---|
| DE | 102007010981 A1 | 9/2008 |
| DE | 202015101481 U1 | 8/2015 |
| EP | 1416233 A2 | 5/2004 |
| FR | 2858601 A1 | 2/2005 |
| JP | S58-164954 A | 9/1983 |
| JP | 60-16280 A | 1/1985 |
| JP | 2002-13835 A | 1/2002 |
| JP | 2002-107003 A | 4/2002 |
| JP | 2005-299974 A | 10/2005 |
| WO | 92/13244 A1 | 8/1992 |
| WO | 00/50827 A1 | 8/2000 |
| WO | 02/099345 A1 | 12/2002 |
| WO | 03/059779 A1 | 7/2003 |
| WO | 2011/032299 A1 | 3/2011 |
| WO | 2018/029522 A1 | 2/2018 |

OTHER PUBLICATIONS

International Search Report issued in International Application No. PCT/IB2017/000940 dated Oct. 19, 2017.

* cited by examiner

TRANSPORT CONTAINER

CROSS-REFERENCE TO RELATED APPLICATIONS

This is the U.S. National Stage of PCT/IB2017/000940, filed Aug. 9, 2017, which claims priority to AT A 367/2016, filed Aug. 9, 2016, and all contents of each of these applications are incorporated herein by reference in their entireties.

The invention relates to a transport container for transporting temperature-sensitive transport goods comprising a chamber for receiving the transport goods, a casing enclosing the chamber and at least one cooling element for temperature control of the chamber, wherein the cooling element comprises:
- an evaporation element with a cooling surface,
- a desiccant for receiving coolant evaporated in the evaporation element,
- a transport path for transporting the evaporated coolant to the desiccant,
- a reservoir for the coolant that is fluidly connectable with the evaporation element.

When transporting temperature-sensitive transport goods, such as drugs, over periods of several hours or days, predetermined temperature ranges must be met during storage and transport to ensure the usability and safety of the drug. For various drugs storage and transport conditions are prescribed that require temperature ranges from 2 to 25° C., especially 2 to 8° C.

The desired temperature range can be above or below the ambient temperature, so that either cooling or heating of the interior of the transport container is required. If the environmental conditions change during a transport operation, the required temperature control includes both cooling and heating. In order that the desired temperature range is permanently and demonstrably adhered to during transport, transport containers with special insulation capacity are used. These containers are equipped with passive or active temperature control elements. Passive temperature control elements do not require any external power supply during use, but use their heat storage capacity, and depending on the temperature level a release or absorption of heat to or from the interior of the transport container occurs. However, such passive temperature control elements are depleted as soon as the temperature equalisation with the interior of the transport container is completed.

A special form of passive temperature control elements are latent heat accumulators that are able to store thermal energy in phase change materials, of which the latent heat of fusion, of solution or of absorption are much greater than the heat that they can store due to their normal specific heat capacity. A disadvantage of latent heat accumulators is the fact that they lose their effect as soon as the entire material has completely gone through the phase change. However, by performing the reverse phase change, the latent heat accumulators may be recharged.

Active temperature control elements require an external energy supply for their operation. They are based on the transformation of a non-thermal energy form into a thermal energy form. The release or absorption of heat takes place, for example, in the context of a thermodynamic cycle such as, e.g. by means of a compression refrigeration machine. Another embodiment of active temperature control elements works on the basis of the thermoelectric principle, wherein so-called Peltier elements are used.

Therefore, the energy needed for the temperature control of a transport container must be carried in the form of an electrical storage or of a thermal storage. In the particular case of transport containers for airfreight, not only the volume, but also the weight and the ability of being allowed, of the temperature control system including the energy storage, is of high importance. The cooling systems existing today often have a large weight in relation to the insulation. The high weight in passive cooling systems is due to the limited enthalpy, which, in the utilizable temperature ranges from 2-8° C., 15-25° C. and 34-38° C., is about 200 kJ/kg. The energy density of accumulators required for active cooling systems is generally greater than 200 kJ/kg, but the maximum permissible energy density for transport in aircraft is limited to approximately 180 kJ/kg.

From WO 02/099345 A1 a transport container has become known, which is equipped with a passive temperature control element in the form of a sorption cooling system. The cooling system comprises an evaporation element with a cooling surface, a desiccant for absorption of the coolant evaporated from the evaporation element, a transport path for transporting the evaporated coolant to the desiccant and a reservoir for the coolant that is fluidly connectable with the evaporation element. As a coolant, for example, water is used, wherein the amount of heat required for the evaporation of the coolant is removed from the transport goods that are to be cooled, the transport goods being cooled in this manner. Such a cooling system is inexpensive and has a low volume and a low weight. Already a comparatively small amount of coolant is sufficient to achieve a high cooling performance, because high amounts of energy are required for the evaporation of liquids, which are significantly higher than those for the phase transition from solid to liquid. The energy required to evaporate water at 8° C. is approx. 2.500 kJ/kg. The absolute amount of water that air or a gas or a gas mixture can absorb (100% relative humidity), depends heavily on the temperature. At a temperature of 30° C., 1 cubic meter of air can absorb 30 gr water, but at a temperature of 5° C. 1 cubic meter of air can only absorb about 7 gr water. The evaporation rate and thus the cooling capacity can be adjusted by the following parameters: the water supply per unit time, the size of the evaporation surface and the relative water saturation of the surrounding gas. In order to achieve a low water saturation of the surrounding gas, the gas loaded with the evaporated water is passed to a desiccant, which adsorbs the water. The desiccant is in this case on that side of the cooling element, that shall emit the heat, and the evaporation layer is located on that side of the cooling element, on which cooling shall be achieved.

A disadvantage of the cooling system described in WO 02/099345 A1 is that cooling no longer takes place as soon as the water is consumed or the saturation of the desiccant is reached. The cooling can only be continued when new coolant and a new desiccant are used. For large transport containers, however, this is very complex and therefore not appropriate. For example, to cool a ship container for 30 days, about 18 Wh/K are required. At a difference of 25K, a cooling capacity of 18 Wh/K*25K=450 Wh is required. The pure evaporation of water requires about 694 Wh/kg; together with the desiccant an energy density for the system of about 347 Wh/kg results. Thus, for the autonomous cooling of a ship container during a period of 30 days about 500 kg of water and 500 kg of desiccant are required. Incidentally, a diesel engine would be much less weight efficient. It requires about 2-3 liters of diesel per hour, which would require a diesel tank of min. 1.440 liters. Furthermore, the weight of the aggregate itself as well as the maintenance and service costs must be considered.

SUMMARY OF INVENTION

The invention therefore aims to provide a transport container of the type mentioned at the outset that has an improved cooling system. In particular, the cooling system is to be improved to the effect that the transport goods can be kept in a predefined temperature range over a longer transport time without changing the weight of the cooling system, or that a weight and/or volume reduction of the cooling system can be achieved without reducing the maximum possible transport time, respectively.

The invention therefore aims to provide a transport container of the type mentioned at the outset that has an improved cooling system. In particular, the cooling system is to be improved to the effect that the transport goods can be kept in a predefined temperature range over a longer transport time without changing the weight of the cooling system, or that a weight and/or volume reduction of the cooling system can be achieved without reducing the maximum possible transport time, respectively.

To achieve this object, the invention essentially provides for a transport container of the type mentioned at the outset, whereby means are provided for evaporating the coolant stored in the desiccant and the desiccant is connected to the reservoir for transporting the vaporized coolant to the reservoir. In this way, the cooling element can be recharged. In the course of the cooling process, the cooling liquid, in particular the water, evaporates, enters the desiccant and is held there. The recharging is accomplished by recuperating the cooling liquid from the desiccant and returning it to the reservoir, wherein the desiccant releases the cooling liquid bound therein by causing it to evaporate. In this case, a preferred embodiment provides that the means for evaporating the coolant comprise a heating device and/or a device for reducing pressure, e.g. a vacuum pump. The heating device is designed, for example, to heat the desiccant to at least 120° C., preferably to about 160-200° C. For this purpose, it can preferably be provided that the heating device comprises heating coils extending through the desiccant. The heating device can preferably be operated electrically.

The invention thus enables the realization of a closed circuit for the coolant.

The evaporated coolant is preferably condensed on the way to the reservoir and passed in the liquid state in the reservoir. A preferred embodiment in this context provides that a line connecting the desiccant and the reservoir is provided for transporting the evaporated coolant. The line connecting the desiccant and the reservoir preferably has at least one meander-shaped section, which serves as a condenser.

Instead of heating the desiccant, the release of the liquid from the desiccant can depending on the desiccant also be effected by lowering the pressure, in particular by generating a vacuum. Then between the reservoir and the desiccant a vacuum pump is used, which generates a negative pressure in the desiccant, whereby the bound liquid is evaporated. On the way to the reservoir, the pressure in the region of the condenser can be increased to liquefy the steam. The higher pressure keeps the coolant in the reservoir in liquid form.

During the cooling process, the connection between the evaporation element and the desiccant is opened while the recharge connection between the desiccant and the reservoir is preferably closed. For charging the cooling element, the connection between the desiccant and the reservoir is opened and the connection between the evaporation element and the desiccant is preferably closed. In terms of design, it is therefore preferably provided that at least one shut-off device is arranged in the transport path for transporting the evaporated coolant to the desiccant. Furthermore, at least one shut-off device is preferably arranged in the line connecting the desiccant and the reservoir.

The shut-off devices can be designed as valves, wherein the valves can be controlled thermally or electrically or mechanically. The control can proceed in such a way that the heating of the desiccant is started during the ongoing cooling process and that the connection between the evaporation element and the desiccant is interrupted after the desiccant has reached, for example, 100° C., wherein the connection of the desiccant to the condenser or the reservoir is preferably opened at the same time or a little later.

The charging can take place, for example, in a harbor or at another location where a power supply is available. For a complete drying or charging of a system with 500 kg desiccant approx. 350 kWh are required, which needs about 28-35 hours with a power supply of 400V/32 A via a CEE connection.

The variant with a vacuum pump or a heating in combination with a vacuum pump is significantly more energy efficient. With the same evaporative cooling performance, the energy consumption for the recuperation of the coolant from the desiccant can be reduced by approximately 70-80%.

The cooling element can be integrated in various ways in the transport container. For example, the evaporation element may be formed as a layer of a layered wall of the transport container. The evaporation element can thus be integrated either in one wall or in several walls of the container. In this case, the evaporation element preferably forms the innermost layer of the respective wall delimiting the chamber to be temperature-controlled. The evaporation elements or layers of the individual walls can be connected via at least one channel with the desiccant, wherein the desiccant is preferably integrated on or in one of the walls of the transport container or arranged thereon at the outside.

Alternatively, the cooling element (comprising the evaporation element, the desiccant and the reservoir for cooling liquid) may also be arranged in a separate external housing, which is fastened to the transport container as required. The chamber of the transport container to be temperature controlled and the evaporation element arranged in the external housing must then be connected via suitable channels with each other, so that the air can be circulated.

The transport container according to the invention is also very interesting for air freight, since the system does neither require electricity nor batteries for the cooling during transport, but it can be partially or fully charged with electricity or/and "coldness".

In the period of charging the cooling element, the cooling is not in operation, wherein a preferred embodiment of the invention provides that a second cooling system is arranged, which is built to cool the chamber, in which the transport goods are received, during charging of the evaporative cooling element. For this purpose, the transport container preferably comprises a latent heat accumulator, which communicates with the chamber for heat exchange.

The latent heat accumulator can not only be used to bridge the charging period of the evaporative cooling system, but can also be operated simultaneously with the same, resulting in a number of other advantages. The cooling capacity of the evaporative cooling system can be reduced so that it can be made smaller and with less weight. The total cooling capacity can be divided between the evaporative cooling system and the latent heat accumulator. The cooling system can be designed so that when the performance of the evaporative cooling system is insufficient and the temperature of the chamber increases, the additional cooling power is obtained from the latent heat accumulator, which requires energy for the phase transition from solid to liquid.

The cooling system may preferably be designed such that the phase transition temperature (solid to liquid) of the latent heat accumulator is chosen to be lower than the temperature resulting from the cooling capacity of the evaporative cooling system. With the evaporative cooling system the temperature of the chamber can preferably be reduced to a temperature of 12-20° C., whereby the further cooling to a temperature in the range of 2–8° C. is performed by means of the latent heat accumulator. Due to this combination the desiccant of the evaporative cooling system may be operated at a higher relative humidity, whereby the amount of desiccant can be reduced. Also, the amount of latent heat accumulator can be reduced, since this only has to provide the energy for cooling from the range of 12-20° C. to the range of 2-8° C.

Another advantage is that, in a partially charged (i.e. not fully crystallized) latent heat accumulator, the same can be used to protect the chamber from supercooling or to keep the chamber within the desired temperature range of, e.g., 2-8° C., when the outside temperature drops below the level of the desired temperature range.

In a preferred embodiment, in which the transport goods are to be kept in the chamber at a temperature range of 2-8° C., the latent heat accumulator has a phase transition temperature of approx. 4-6° C.

If the transport container is stored in a refrigerated warehouse (e.g. in a customs warehouse) for a long time (e.g. for several days), e.g. at a temperature of 2-8° C., and the evaporative cooling system is set to a cooling capacity so as to achieve a temperature lying above the temperature prevailing in the refrigerated warehouse, the evaporative cooling system is not active during the storage period, so that no coolant is consumed. Furthermore, the period of storage can be used to charge the latent heat accumulator, which happens automatically in the refrigerated warehouse at a temperature of e.g. below 6° C., if the phase transition temperature of the latent heat accumulator is at 6° C. As a result, with minimal dimensioning of the two systems (latent heat accumulator and evaporative cooling system) a longer operation or transport duration of the transport container can be achieved as if only one cooling system would be used alone.

Another advantage arises when the evaporative cooling system provides more cooling capacity than required. The excess cooling power can then be used to recharge the latent heat accumulator, i.e. to have it returned into the solid or crystallized state.

A preferred embodiment of the invention provides that the evaporative cooling system and the latent heat accumulator are arranged in cascading manner, i.e. that seen in the direction from the outside to the inside of the transport container first the evaporative cooling system is effective and then the latent heat accumulator. The cooling surface of the evaporation element communicates therefore with the latent heat accumulator for heat exchange and the latent heat accumulator communicates with the chamber for heat exchange. From a constructive point of view, this can preferably be realized in that the latent heat accumulator is arranged between the cooling surface and the chamber.

If the cooling capacity of the evaporative cooling system is set to a temperature above the phase transition temperature of the latent heat accumulator, a preferred embodiment provides that the cooling surface and the latent heat accumulator are separated by a thermal insulation. Although the cooling surface of the evaporation element and the latent heat accumulator then form a heat exchange connection, the heat exchange, however, is significantly slowed down by the thermal insulation, so that there is a corresponding temperature gradient.

To ensure a safe operation of the evaporative cooling system, wherein the relative humidity can be controlled independently of the environment, it is preferably provided that the cooling element is sealed against the environment in a vapour diffusion tight manner. The evaporated coolant is thus completely adsorbed in the desiccant, wherein the cooling capacity may be adjusted in a simple manner by adjusting the relative humidity prevailing in the gas atmosphere of the evaporative cooling system.

Furthermore, it is preferably provided that the evaporation element and the desiccant are separated by a thermal insulation. The thermal insulation may be formed as an insulation layer arranged between the evaporation element and the desiccant, wherein the insulation layer can be used as a transport path for transporting the evaporated coolant to the desiccant. A preferred embodiment provides in this context provides that the thermal insulation between the evaporation element and the desiccant comprises an insulating layer that is permeable to vapour diffusion, which forms the transport path.

Alternatively, the transport path may comprise at least one channel extending between the evaporation element and the desiccant.

Particularly suitable as desiccant are silica gels. These are inexpensive and can absorb up to 60% of their own weight of liquid, especially water.

The evaporation element advantageously comprises a textile, in particular a felt, which contains the coolant, in particular water. In principle, any material that has a large surface area is suitable.

With regard to the latent heat accumulator, one is preferred, the phase change of which occurs in the temperature range of the desired temperature by the transition between solid and liquid or vice versa. Preferred phase change materials include paraffins and salt mixtures, such as, e.g., RT5 of the company Rubitherm or products from the company Sasol.

Particularly preferably, the latent heat accumulator has a phase transition temperature of 3-10° C., in particular 5° C., so that the chamber for the transport goods can be kept in a simple manner in a temperature range of 2-8° C.

The latent heat accumulator may preferably be formed as a plate-shaped element. According to an advantageous embodiment the plate-shaped element may comprise a plurality of in particular honeycomb-shaped hollow chambers, which are filled with the latent heat accumulator material, wherein a honeycomb structural element according to WO 2011/032299 A1 is particularly advantageous.

A particularly efficient temperature control is achieved according to a preferred embodiment, when the latent heat accumulator chamber surrounds the chamber on all sides. Furthermore, it can also be provided that the cooling surface of the evaporation element surrounds the chamber on all sides.

In this context, it can be provided that the latent heat accumulator and the evaporation element each form a layer of the shell of the transport container.

The transport container according to the invention can in principle be realized in any dimensions.

BRIEF DESCRIPTION OF THE DRAWINGS

The invention will be explained in more detail with reference to embodiments schematically illustrated in the drawing. Therein.

The invention will be explained in more detail with reference to embodiments schematically illustrated in the drawing. Therein.

In FIG. 1, a cooling system is shown, which comprises an evaporative cooling system 1 and a latent heat accumulator 2. The evaporative cooling system 1 comprises an evaporation element 3, which is soaked with a coolant, such as e.g. water, and has a cooling surface 4, and a desiccant 5 for receiving evaporated coolant from the evaporation element 3. To supply the evaporation element 3 with coolant, the same is connected to a reservoir 6. The transport of the evaporated coolant from the evaporation element 3 to the desiccant 5 is performed via a channel 10. The common shell or wall of the evaporation element 3, the channel 10 and the desiccant 5 is gas-tight, so that the relative humidity of the gas atmosphere within the evaporative cooling system 1 can be regulated independently from the environment. The evaporated coolant is absorbed in the desiccant 5, which is e.g. a silica gel.

Figure 1:
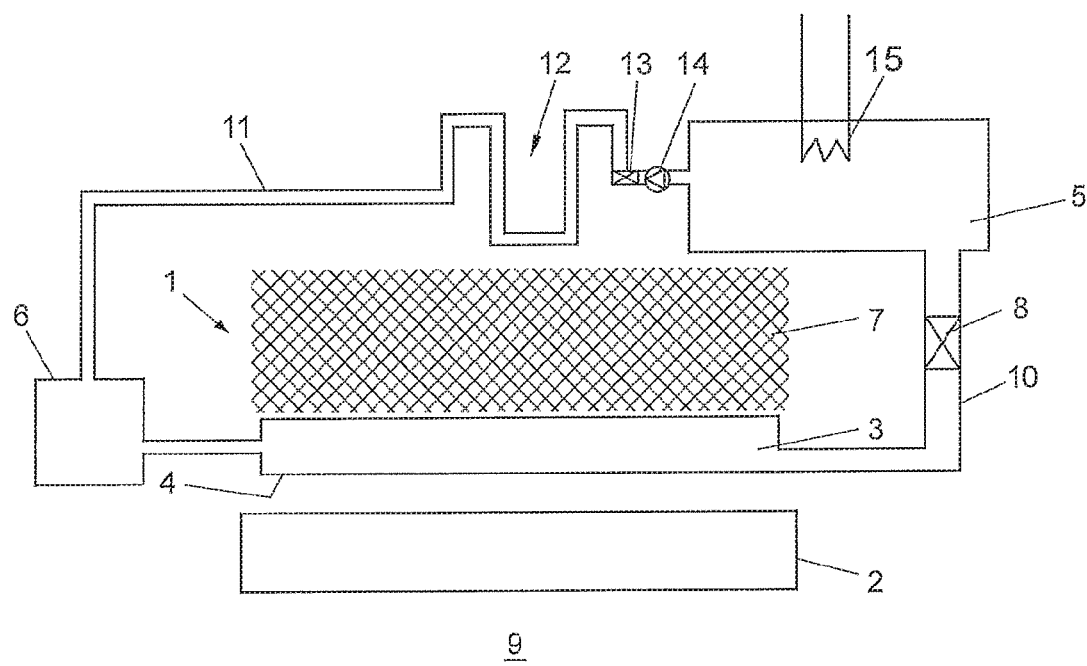
FIG. 1 shows an embodiment of the cooling system for a transport container according to the invention.

In that case the desiccant 5 is located on that side of the evaporative cooling system 1, on which heat is to be emitted, and the evaporation element 3 is located on that (opposite) side of the evaporative cooling system 1, on which cooling is to be effected. On the heat-emitting side of the evaporation element 3, a thermal insulation 7 is arranged.

On the cooling side of the evaporative cooling system 1, a plate-shaped latent heat accumulator 2 is arranged, which is in heat exchange connection with the cooling surface 4 of the evaporative cooling system 1 either directly or with the interposition of a thermal insulation (not shown). On the side of the latent heat accumulator 2 facing away from the evaporative cooling system 1, the chamber 9 to be temperature controlled is arranged.

In the channel 10, a valve 8 is arranged, with which the connection between the evaporation element 3 and the desiccant 5 can be opened or closed. Furthermore, a channel 11 is provided, which connects the desiccant 5 with the reservoir 6, to direct coolant, which was recuperated from the desiccant 5 by evaporation, in the reservoir 6. For evaporating the coolant from the desiccant 5, a heating device 15 and/or a vacuum pump 14 is arranged. The vaporized coolant enters the channel 11 and, with the valve 13 open, passes through the condenser 12, where the coolant is cooled, so that it is added to the reservoir 6 in its liquid state.

Figure 2:
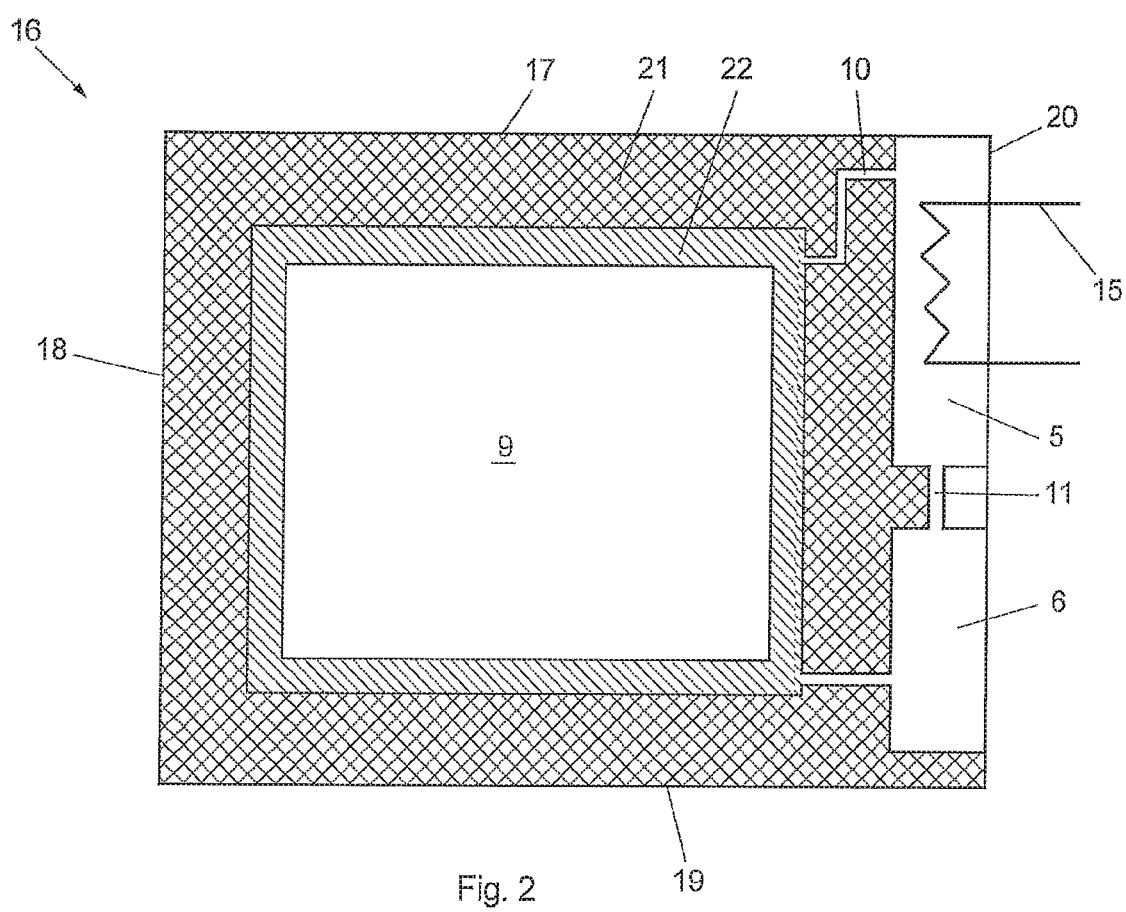
FIG. 2 shows a first embodiment of the transport container with such a cooling system.

FIG. 2 shows a cuboid transport container 16 in cross section, whose walls are denoted by 17, 18, 19 and 20. The walls 17, 18, 19 and 20 comprise a layer structure with an outer insulating layer 21 of heat-insulating material and an inner layer 22, which forms the evaporation element. The evaporation element 22 is connected to the desiccant 5 via a channel 10 extending through the insulating layer 21. Furthermore, a channel 11 is provided, which connects the desiccant 5 with the reservoir 6, to direct coolant, which was recuperated from the desiccant 5 by evaporation, in the reservoir 6. For evaporating the coolant from the desiccant 5, a heater 15 is arranged. The evaporated coolant enters the channel 11 and, with the valve open (not shown), passes through a condenser (not shown), where the coolant is cooled so that it is added to the reservoir 6 in the liquid state. The unit consisting of the desiccant, the channel 11 and the reservoir 6 may be built as a unit that is removable from the transport container 16 in order to ensure easy attachment and removal.

DETAILED DESCRIPTION

In FIG. 1, a cooling system is shown, which comprises an evaporative cooling system 1 and a latent heat accumulator 2. The evaporative cooling system 1 comprises an evaporation element 3, which is soaked with a coolant, such as e.g. water, and has a cooling surface 4, and a desiccant 5 for receiving evaporated coolant from the evaporation element 3. To supply the evaporation element 3 with coolant, the same is connected to a reservoir 6. The transport of the evaporated coolant from the evaporation element 3 to the desiccant 5 is performed via a channel 10. The common shell or wall of the evaporation element 3, the channel 10 and the desiccant 5 is gas-tight, so that the relative humidity of the gas atmosphere within the evaporative cooling system 1 can be regulated independently from the environment. The evaporated coolant is absorbed in the desiccant 5, which is e.g. a silica gel.

Figure 3:
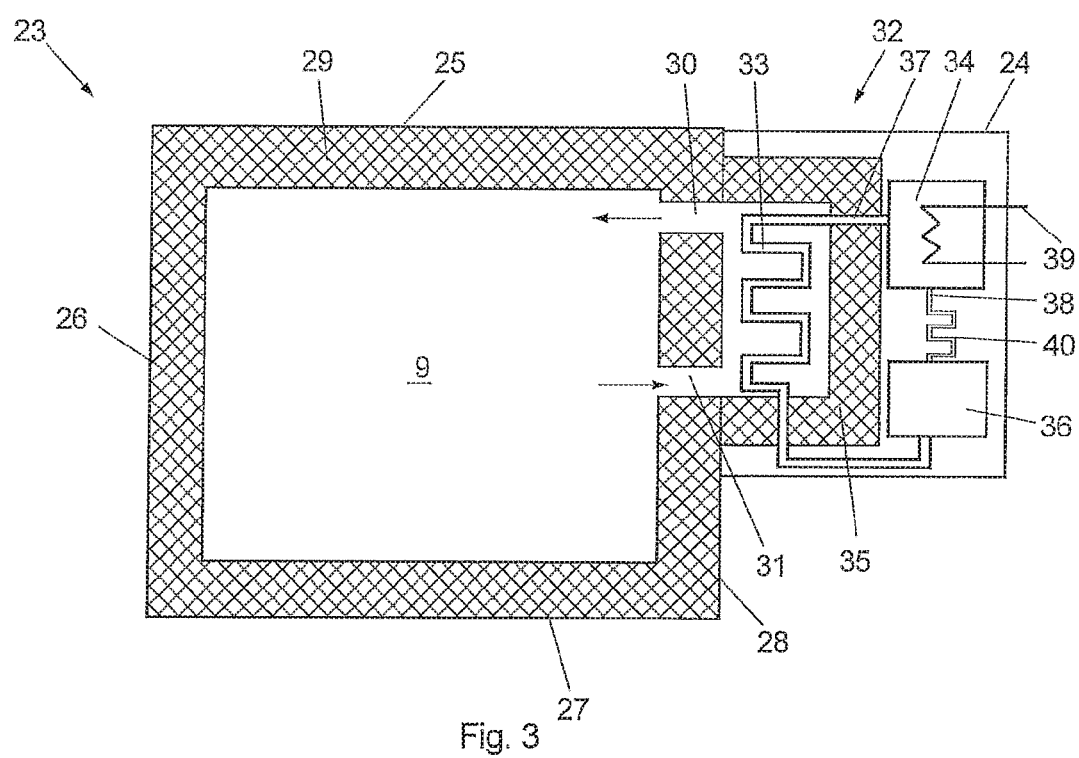
FIG. 3 shows a second embodiment of a transport container with such a cooling system.

In the embodiment according to FIG. 3, the cooling device comprising the evaporation element, the desiccant and the reservoir is accommodated in an external housing 24, which can be attached to conventional transport containers as required. FIG. 3 shows a cuboid transport container 23 in cross section, whose walls are designated 25, 26, 27 and 28. The walls 25, 26, 27 and 28 each comprise an insulating material 29 of heat-insulating material. The wall 28 is provided with openings 30 and 31, wherein a fan ensures that the air in the chamber 9 of the container 23 is circulated, wherein the air is passed through the opening 31 to the cooling unit 32 and the air cooled there is returned to the chamber 9. The cooling unit 32 in turn comprises a meander-shaped evaporation element 33, a desiccant 34, an insulating material 35 arranged therebetween and a reservoir 36 for the cooling liquid. The evaporation element 33 is connected to the desiccant 34 via a channel 37 extending through the insulation 35. Furthermore, a channel 38 is provided, which connects the desiccant 34 with the reservoir 36 in order to direct the coolant, which was recuperated from the desiccant 34 by evaporation, in the reservoir 36. For evaporating the coolant from the desiccant 34, a heater 39 is arranged. The evaporated coolant enters channel 38 and, with the valve open (not shown), passes through a condenser 40, where the coolant is cooled so that it is added to the reservoir 36 in its liquid state.

The invention claimed is:
1. A transport container for transporting temperature-sensitive transport goods comprising a chamber for receiving the transport goods, a housing enclosing the chamber and at least one cooling element for temperature control of the chamber, wherein the at least one cooling element comprises:

an evaporation element with a cooling surface, a desiccant for receiving coolant evaporated in the evaporation element, a transport path for transporting the evaporated coolant to the desiccant, a reservoir for the coolant which can be brought into fluid communication with the evaporation element, wherein means are provided for evaporating the coolant stored in the desiccant and that the desiccant is connected to the reservoir for transporting the evaporated coolant to the reservoir, wherein the means for evaporating the coolant comprise a vacuum pump, which is arranged in a line that connects the desiccant and the reservoir.

2. The transport container according to claim 1, wherein the means for evaporating the coolant further comprise a heating device.

3. The transport container according to claim 2, wherein the heating device comprises heating coils extending through the desiccant.

4. The transport container according to claim 1, wherein the line connecting the desiccant and the reservoir has at least one meandering portion, which serves as a condenser.

5. The transport container according to claim 4, wherein at least one shut-off device is arranged in the line connecting the desiccant and the reservoir.

6. The transport container according to claim 1, wherein at least one shut-off device is arranged in the transport path for transporting the evaporated coolant to the desiccant.

7. The transport container according to claim 1, wherein at least one shut-off device is arranged in the line connecting the desiccant and the reservoir.

8. The transport container according to claim 1, wherein the at least one cooling element is sealed against the environment in a vapour diffusion tight manner.

9. The transport container according to claim 1, wherein the transport container further comprises a latent heat accumulator, which communicates with the chamber to exchange heat.

10. The transport container according to claim 9, wherein the cooling surface is connected with the latent heat accumulator to exchange heat and that the latent heat accumulator is connected with the chamber to exchange heat.

11. The transport container according to claim 10, wherein the latent heat accumulator is arranged between the cooling surface and the chamber.

12. The transport container according to claim 9, wherein the latent heat accumulator is arranged between the cooling surface and the chamber.

13. The transport container according to claim 9, wherein the cooling surface and the latent heat accumulator are separated from each other by a thermal insulation.

14. The transport container according to claim 13, wherein the evaporation element and the desiccant are separated from each other by a thermal insulation.

15. The transport container according to claim 9, wherein the latent heat accumulator has a phase transition temperature of 3-10° C.

16. The transport container according to claim 1, wherein the evaporation element and the desiccant are separated from each other by a thermal insulation.

17. The transport container according to claim 16, wherein the thermal insulation arranged between the evaporation element and the desiccant comprises an insulating layer that is permeable to vapour diffusion and which forms the transport path.

18. The transport container according to claim 1, wherein the transport path comprises at least one channel extending between the evaporation element and the desiccant.

19. The transport container according to claim 1, wherein the evaporation element comprises a coolant receiving textile.

20. The transport container according claim 19, wherein the coolant comprises water and wherein the textile comprises a felt.

* * * * *